United States Patent
Robertson

(10) Patent No.: US 8,323,369 B2
(45) Date of Patent: Dec. 4, 2012

(54) APPARATUS FOR TREATING MATERIALS

(76) Inventor: Struan Glen Robertson, Paradise Waters (AU)

(*) Notice: Subject to any disclaimer, the term of this patent is extended or adjusted under 35 U.S.C. 154(b) by 684 days.

(21) Appl. No.: 12/086,168

(22) PCT Filed: Nov. 29, 2006

(86) PCT No.: PCT/AU2006/001804
§ 371 (c)(1),
(2), (4) Date: Oct. 21, 2009

(87) PCT Pub. No.: WO2007/065202
PCT Pub. Date: Jun. 14, 2007

(65) Prior Publication Data
US 2010/0032279 A1    Feb. 11, 2010

Related U.S. Application Data

(60) Provisional application No. 60/742,461, filed on Dec. 5, 2005.

(51) Int. Cl.
*B01D 50/00* (2006.01)
(52) U.S. Cl. .............. 55/320; 55/385.1; 55/462; 55/485; 202/117; 202/131; 202/133; 202/218
(58) Field of Classification Search .................. 202/117, 202/118, 131, 133, 136, 137, 139, 218; 55/320, 55/318, 447, 462, 385.1
See application file for complete search history.

(56) References Cited

U.S. PATENT DOCUMENTS

| | | | | |
|---|---|---|---|---|
| 1,677,758 A * | 7/1928 | Frank | ................................ | 208/7 |
| 1,921,993 A * | 8/1933 | McQuade | ..................... | 202/118 |
| 2,108,034 A * | 2/1938 | Eppensteiner | ................. | 75/697 |
| 3,787,292 A * | 1/1974 | Keappler | ..................... | 202/118 |
| 5,018,707 A * | 5/1991 | Hemsath et al. | .............. | 266/254 |
| 5,199,354 A * | 4/1993 | Wood | ............................. | 110/241 |
| 5,579,704 A * | 12/1996 | Mansur | ......................... | 110/185 |
| 5,989,486 A * | 11/1999 | Washburn et al. | ............ | 266/145 |
| 6,039,774 A * | 3/2000 | McMullen et al. | ......... | 48/102 A |
| 6,143,136 A * | 11/2000 | Aulbaugh et al. | ............. | 201/25 |
| 6,341,567 B1 * | 1/2002 | Robertson et al. | ............ | 110/203 |

FOREIGN PATENT DOCUMENTS

JP  2000-274955 A  10/2000
JP  2005-172276 A  6/2005

* cited by examiner

*Primary Examiner* — Robert A Hopkins
(74) *Attorney, Agent, or Firm* — Morriss O'Bryant Compagni

(57) ABSTRACT

Apparatus for treating materials, the apparatus including a main body which includes an elongated retort section having a primary treatment chamber therein, a feed inlet at an upstream end of the retort section and a discharge outlet at a downstream end of the retort section. The main body further includes a filtering section with a filtering chamber therein which is in communication with the primary treatment chamber, the filtering chamber being disposed laterally with respect to a longitudinal axis of the retort section which extends between the ends of the retort section and is spaced from the upstream end.

18 Claims, 3 Drawing Sheets

APPARATUS FOR TREATING MATERIALS

CROSS-REFERENCE TO RELATED APPLICATION

This application is the National Stage of International Application No. PCT/AU2006/001804 filed Nov. 29, 2006, which claims priority to provisional patent application Ser. No. 60/742,461 filed Dec. 5, 2005.

TECHNICAL FIELD

This invention relates generally to the treatment of materials and more particularly, but not exclusively, to method, and apparatus suitable for use in the removal of contaminants from solids and liquids. For example, the method and apparatus of the present invention is suitable for use with materials containing sulphur but can also be used for the treatment of other material and contaminants.

SUMMARY OF THE INVENTION

According to one aspect of the present invention there is provided an apparatus for treating materials, the apparatus including a main body which includes an elongated retort section having a primary treatment chamber therein, a feed inlet at an upstream end of the retort section and a discharge outlet at a downstream end of the retort section, the main body further including a filtering section with a filtering chamber therein which is in communication with the primary treatment chamber, the filtering chamber being disposed laterally with respect to a longitudinal axis of the retort section which extends between the ends of the retort section and is spaced from the upstream end.

The feed inlet may be in the form of a chute which is inclined so as to direct material to a desired position within the chamber.

The apparatus further includes a combustion chamber which at least partially surrounds the retort section and extends at least partially along the length thereof in the direction of the longitudinal axis. Preferably the combustion chamber is in the form of heat jacket which surrounds the retort section and the filtering section.

The primary treatment chamber is preferably circular in cross-section. Preferably the retort section is generally cylindrical in cross section. Preferably the longitudinal axis of the retort section is inclined downwardly from the upstream end towards the downstream end. A material transfer device may be disposed within the primary treatment chamber. The material transfer device may include a plurality of spaced apart sweeping arms operatively mounted to a rotatable shaft which is generally coaxially arranged with the longitudinal axis of the retort section. Preferably the feed chute extends downstream beyond the most upstream sweeper arm to try and ensure that all material is engaged by the device. The upstream sweeper arm is preferably angled so that it can pick up the material entering the chamber and inhibit build up of material. The shaft may be driven by any suitable means such as an electric or hydraulic motor or the like.

Preferably the filter chamber includes an intake zone which receives gases from the primary treatment chamber and a filtering zone. A baffle plate preferably separates the intake zone from the filtering zone with a transfer passage providing communication therebetween. A plurality of filters preferably made of silica or ceramic materials may be disposed within the filtering zone and filtered gases are passed to a collecting chamber. An induction fan may be provided to draw the gas through the filters into the collecting chamber whereafter the gas can be transferred to a condenser for example. The intake zone may include a plurality of fins or plates on the inner wall and baffle plate which tend to deflect particulate matter towards the outlet. A paddle member may be provided which is mounted to sweeper shaft for rotation therewith. A primary deflector plate may be disposed in the region of the entry from the primary treatment chamber to the intake zone of the filtering chamber.

The combustion chamber may include a heat jacket having refractory lined walls and includes heating elements in the region of the retort section. Preferably the heating elements are spaced along the length of the retort section and are arranged in groups which are arranged from the lower part of the chamber and extend at least partially up each side. The heating elements may be in the form of burners, the flames of which are directed away from the retort section causing the refractory lined walls of the chamber to radiate heat as well as cause convection heating.

BRIEF DESCRIPTION OF THE DRAWINGS

Preferred embodiments of the invention will hereinafter be described with reference to the accompanying drawings:

FIG. 1 is a schematic sectional side elevation of apparatus according to one embodiment of the present invention;

FIG. 2 is a schematic sectional view taken along the line x-x in FIG. 1 with some components omitted;

Figure 3:
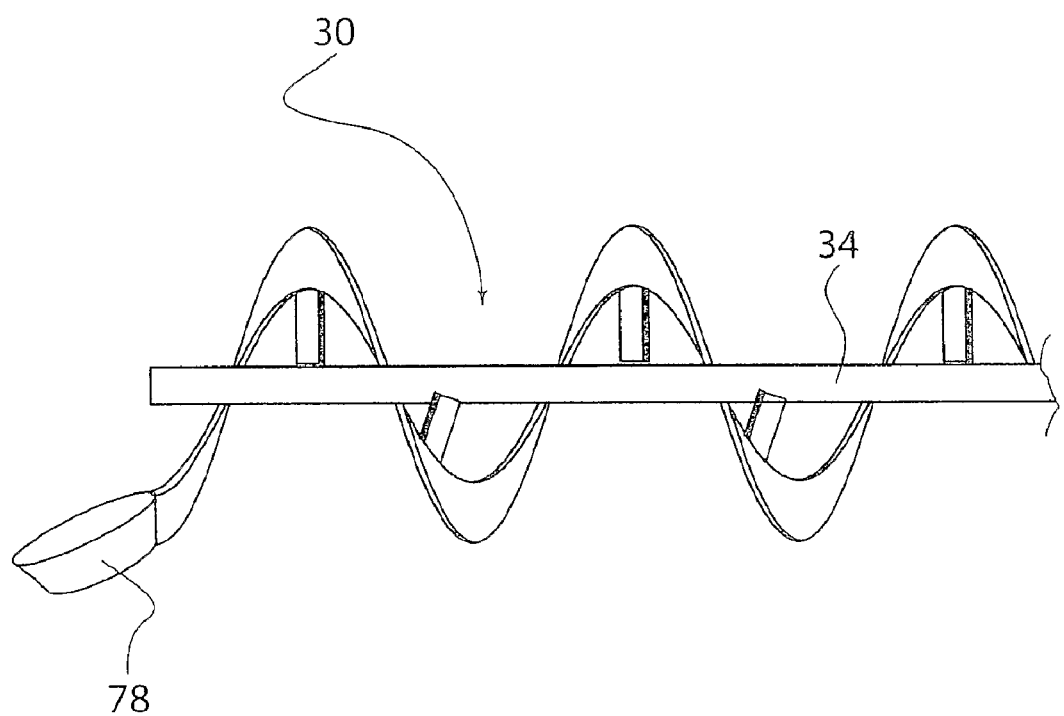
FIG. 3 is a schematic view of part of a component of the apparatus.

Reference will now be made in detail to the present preferred embodiment of the invention, an example of which is illustrated in the accompanying drawings.

DETAILED DESCRIPTION OF THE PREFERRED EMBODIMENT

Figures 1, 2:
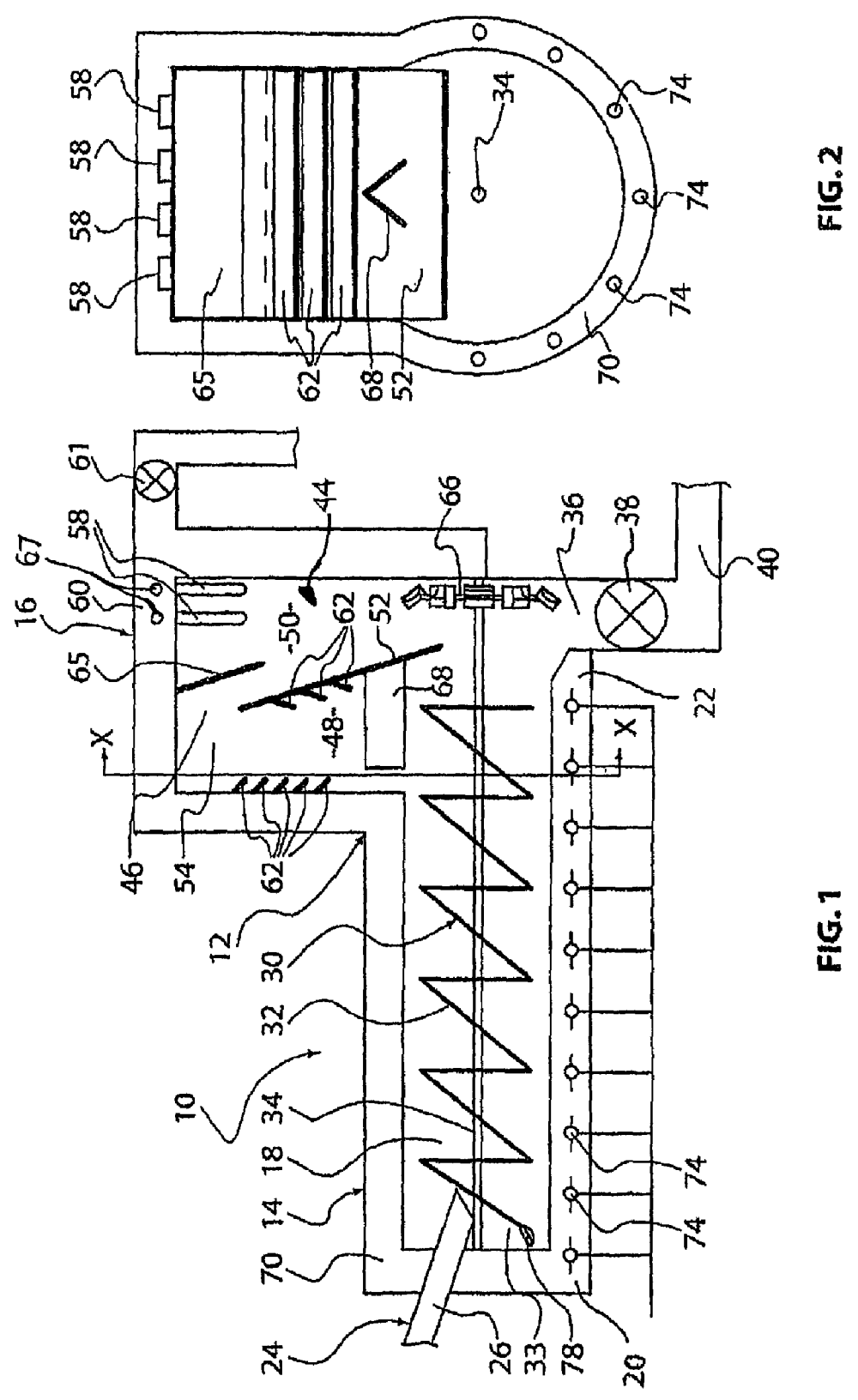

With reference to the drawings, FIG. 1 is a schematic illustration of apparatus for treating materials according to one embodiment of the present invention. The apparatus generally indicated at 10 includes a main body 12 having an elongated retort section 14 and a filtering section 16. The retort section 14 is an elongated body with a primary treatment chamber 18 therein and has an upstream end 20 and a downstream end 22. A feed inlet 24 is disposed at the upstream end for delivering material to be treated to the primary treatment chamber 18. The feed inlet 24 is in the form of a chute 26 which is inclined so as to direct material to a desired position within the chamber 18. The retort section 14 is inclined downwardly from the upstream end towards the downstream end to assist passage of material therealong. Any suitable feed mechanism may be used for delivering the material to the chute. Preferably the mechanism inhibits the entry of air and may for example be in the form of a rock hopper, a rotary valve or a mono pump.

As shown in FIGS. 1 and 3, a material transfer device 30 is disposed within the primary treatment chamber 18. The device 30 includes a plurality of sweeper arms 32 mounted to a centrally located rotatable shaft 34, the sweeper arms being configured to urge the material to be treated along the chamber 18 from the upstream end towards the downstream end. As shown the feed chute 26 extends downstream beyond the upstream sweeper arm 33 to try and ensure that all material is engaged by the device 30. The upstream sweeper arm 33 is angled and has a scoop 78 on its end so that it can pick up the material entering the chamber and inhibit build up of material. The sweeper arm 33 and scoop are angled so that it can get into the bottom feed end of the retort so as to prevent a build up of material and move it forward for exposure to the retort walls. The shaft may be driven by any suitable means such as an electric or hydraulic motor or the like.

A discharge outlet 36 is disposed at the downstream end of the retort section through which treated solid matter can be discharged from the chamber 18. A rotary valve 38 is arranged at the outlet 36 and solid material passes through the valve to an auger a passage 40 which transfers the treated solids to a suitable collection site.

Figure 4:
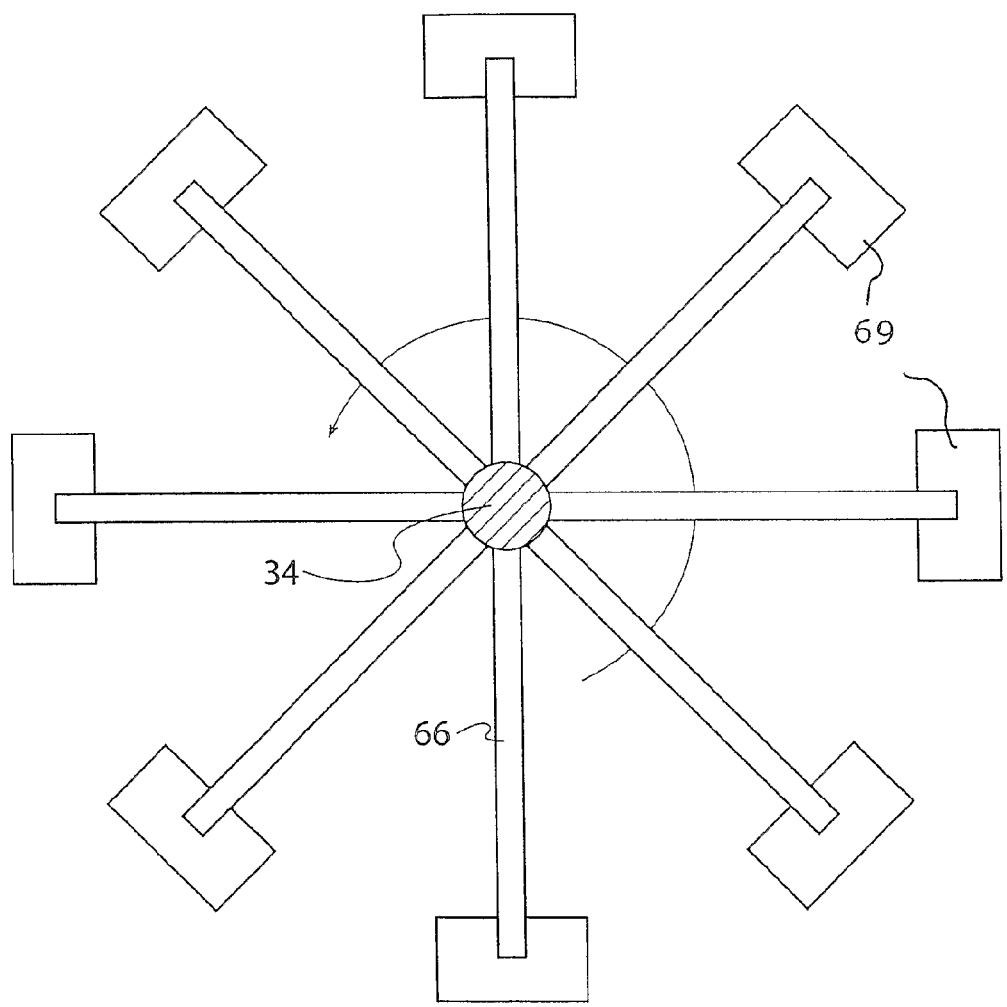
FIG. 4 is a schematic view of another component of the apparatus.

The filtering section 16 is disposed above the retort section 14 and includes a filtering chamber 46 therein. The filter chamber 46 includes an intake zone 48 which received gases from the primary treatment chamber 18 and a filtering zone 50. A baffle plate 52 separates the intake zone 48 from the filtering zone 50 with a transfer passage 54 providing communication therebetween. A plurality of filters 58 made of silica or ceramic materials are disposed within the filtering zone 50 and filtered gases are passed to a collecting chamber 60. An induction fan 61 draws the gas through the filters into the collecting chamber 60 whereafter the gas can be transferred to a condenser for example. The intake zone 48 includes a plurality of fins or plates 62 on the inner wall of the filtering section and baffle plate 52 which tend to deflect particulate matter towards the outlet. These fins or plates 62 also disrupt the air flow which reduces the velocity of the gases and its ability to carry particulates. The fins or plates are arranged at regularly spaced intervals along the walls to ensure maximum exposure to the gases and thereby reducing the particulate load for handling by the filters. Particulate matter within the filtering zone is returned towards the discharge outlet via a paddle member 66 (FIGS. 1 and 4) having paddles 69 on the end of each arm of the paddle member which is mounted to shaft 34 for rotation therewith. The paddles are really small buckets angled to collect the filter box particulates and direct them downwards to the back of the retort wall so they will fall into the product collection chute. The paddles/buckets will not be deep but sufficient to take a small quantity of particulates thereby forcing them down and to the retort wall create a direction flow that other free flowing particulates will follow. The particulates exit chute from filter chamber should be long enough and angled so that the particulates exiting the filter box will hit the downward cycle of the paddles ensuring that they move directly to the discharge outlet thereby reducing the quantity of filter particulates that may find there way back into the flow towards the filter chamber. A primary deflector plate 68 is disposed in the region of the entry from the primary treatment chamber 18 to the intake zone 40 of the filtering chamber 46. The plate 68 tends to cause the return of particulates to the downstream end of the treatment chamber for discharge.

The apparatus further includes a pressure sensor which monitors the pressure build up caused by the particulates blocking the filters. At a predetermined pressure a pulse of nitrogen can be delivered from nozzles 67 that unblocks the filters causing the particulates to fall towards the bottom of the filtering chamber where the paddle forces them towards the discharge outlet. Desirably the area of the filters is about the same as the volume of gases produced. A plate 65 is disposed at the top of the filtering chamber. The plate 65 tends to direct the flow of gas towards the bottom of the chamber towards the discharge outlet. The plate forms a duct for directing gas flow and speeds up the particulates to and in their exit from the outlet. The plate also limits direct contact of the particulates on the filters.

The apparatus 10 further include a combustion chamber 70 which substantially encloses the chamber 18 and filtering section 44 of the apparatus. The combustion chamber 70 is in the form of a heat jacket and includes heating elements 74 in the region of the retort section 14. The heating jacket is formed of steel capable of withstanding temperatures up to 1000° C. The heating elements 74 are spaced along the length of the retort section and are arranged in groups which are arranged from the lower part of the chamber and extend up each side (FIG. 2). The heating elements are in the form of burners, the flames of which are directed away from the retort section causing the refractory lined walls of the chamber to radiate heat as well as cause convection heating. By arranging the burners in groups spaced along the bottom half of the combustion chamber means that a steady flow of material along the primary treatment chamber and as a result of the action of the sweeper arms the material is mixed and exposed to the heated walls of the retort section to reduce higher than needed temperatures. This means that the apparatus can have a relative high throughput rate because of the relatively high heat transfer from the retort section walls and the material being treated. The exhaust combustion gases can be used for the pre-treatment of material that may be high in moisture. This provides for a heat recovery application in which the exhaust gases heat an oil filled jacket which surrounds two screws that move the material towards the inlet.

In the particular case where the material to be treated contains sulphur, soda ash or caustic soda is added to the material prior to entry to the retort section. This helps remove the sulphur during the process and greatly enhances the efficiency of the process in treating the cleaned gases are the particulate removal phase and greatly reduces the sulphur contamination. The action of the device 30 in the retort section combined with the burner configuration will increase hot retort wall exposure and improve the sulphur reduction in the gas stream and the resultant products such as gas and condensate.

Finally, it is to be understood that various alterations, modifications and/or additions may be incorporated into the various constructions and arrangements of parts without departing from the spirit or ambit of the invention.

The invention claimed is:

1. Apparatus for treating materials, the apparatus comprising:
   a main body which includes an elongated retort section having a primary treatment chamber therein;
   a feed inlet at an upstream end of the retort section;
   a discharge outlet at a downstream end of the retort section;
   a material transfer device positioned in the elongated retort section to transfer material through the retort section;
   a filtering section with a filtering chamber therein which is in communication with the primary treatment chamber to separate particulate matter from gases generated in the retort section, the filtering chamber being disposed laterally with respect to a longitudinal axis of the retort section which extends between the ends of the retort section and being spaced from the upstream end of the retort section
   an intake zone, located in the filtering chamber and being positioned to receive gas from primary treatment chamber, and a filtering zone; and
   a baffle plate disposed at the top of the filtering chamber and positioned to facilitate separation of the particulate matter from the gases, and to direct the particulate matter toward the discharge outlet of the retort section.

2. Apparatus according to claim 1 wherein the feed inlet comprises a chute which is inclined so as to direct material to a desired position within the chamber.

3. Apparatus according to claim 2 further including a combustion chamber which at least partially surrounds the retort section and extends at least partially along the length thereof in the direction of the longitudinal axis of the retort section, the combustion chamber comprising a heat jacket which surrounds the retort section and the filtering section.

4. Apparatus according to claim 1 wherein the primary treatment chamber is circular in cross-section and the retort section is generally cylindrical in cross section, the longitudinal axis of the retort section being inclined downwardly from the upstream end towards the downstream end.

5. Apparatus according to claim 1, wherein the material transfer device includes a plurality of spaced apart sweeper arms operatively mounted to a rotatable shaft which is generally coaxially arranged with the longitudinal axis of the retort section.

6. Apparatus according to claim 5 wherein the feed inlet comprises a feed chute that is inclined and extends downstream beyond the most upstream sweeper arm to direct all material to a selected location of the retort section to provide engagement of material by the material transfer device, the upstream sweeper arm being angled so that it can pick up the material entering the chamber from the inclined feed inlet and inhibit build up of material.

7. Apparatus according to claim 1 wherein the baffle plate is positioned to separate the intake zone from the filtering zone and provide a transfer passage providing communication therebetween, and wherein the filter chamber further comprises a plurality of filters disposed within the filtering zone and arranged so that filtered gases can be passed to a collecting chamber.

8. Apparatus according to claim 7 further comprising an induction fan that is adapted to draw the gas through the filters into the collecting chamber.

9. Apparatus according to claim 7 wherein the intake zone includes a plurality of fins or plates on an inner wall of the filtering chamber and baffle plate which provide deflection of particulate matter towards the discharge outlet.

10. Apparatus according to claim 9 including a paddle member mounted to a rotatable shaft for rotation therewith, the paddle member being located at and mounted to the downstream end of the shaft.

11. Apparatus according to claim 10 including a primary deflector plate disposed in the region of the entry from the primary treatment chamber to the intake zone of the filtering chamber.

12. Apparatus according to claim 1 further comprising a combustion chamber comprising a heat jacket having refractory lined walls and includes heating elements in the region of the retort section, the heating elements being spaced along the length of the retort section and being arranged in groups which are arranged from the lower part of the chamber and extend at least partially up each side of the retort section, the heating elements being in the form of burners, the flames of which are directed away from the retort section causing the refractory lined walls of the combustion chamber to radiate heat as well as cause convection heating.

13. Apparatus for treating materials, comprising:
a non-rotatable main body which includes an elongated retort section having a primary treatment chamber therein;
a feed inlet at an upstream end of the retort section
a discharge outlet at a downstream end of the retort section;
a filtering section provided in the main body, the filtering section having a filter chamber therein which is in communication with the primary treatment chamber, the filter chamber being disposed laterally with respect to a longitudinal axis of the retort section which extends between the ends of the retort section and being spaced from the upstream end; and
an intake zone, located within the filter chamber and positioned to receive gases from the primary treatment chamber, a filtering zone and a baffle plate positioned to separate the intake zone from the filtering zone with a transfer passage therebetween for communication of gases, a plurality of filters being disposed within the filtering zone and arranged so that filtered gases can be passed to a collecting chamber and separated particulates are directed to the discharge outlet.

14. Apparatus according to claim 13 wherein the filtering chamber is disposed above the retort section at the downstream end thereof.

15. Apparatus according to claim 14 further including a combustion chamber which at least partially surrounds the retort section and extends at least partially along the length thereof in the direction of the longitudinal axis, the combustion chamber comprising a heat jacket which surrounds the retort section and the filtering section.

16. Apparatus according to claim 14 further including a material transfer device disposed within the primary treatment chamber, the material transfer device including a plurality of spaced apart sweeper arms operatively mounted to a rotatable shaft which is generally coaxially arranged with the longitudinal axis of the retort section for rotation within the primary treatment chamber relative to the retort section.

17. Apparatus according to claim 13 further comprising a combustion chamber including a heat jacket having refractory lined walls and having heating elements in the region of the retort section, the heating elements being spaced along the length of the retort section and being arranged in groups which are arranged from the lower part of the chamber and extend at least partially up each side of the combustion chamber, the heating elements being in the form of burners, the flames of which are directed away from the retort section causing the refractory lined walls of the combustion chamber to radiate heat as well as cause convection heating.

18. Apparatus for treating materials, the apparatus including a main body which includes an elongated retort section having a primary treatment chamber therein, a feed inlet at an upstream end of the retort section and a discharge outlet at a downstream end of the retort section, the main body further including a filtering section with a filtering chamber therein which is in communication with the primary treatment chamber, the filtering chamber being disposed laterally with respect to a longitudinal axis of the retort section which extends between the ends of the retort section and is spaced from the upstream end, a material transfer device disposed within the primary treatment chamber, the material transfer device including a plurality of spaced apart sweeping arms operatively mounted to a rotatable shaft which is generally coaxially arranged with the longitudinal axis of the retort section for rotation within the primary treatment chamber relative to the retort section and a combustion chamber which at least partially surrounds the retort section and extends in the direction of the longitudinal axis of the retort, the combustion chamber including a heat jacket having refractory lined walls and having heating elements in the region of the retort section, the heating elements being spaced along the length of the retort section and arranged in groups which are in the lower part of the chamber and extend at least partially up each side, the heating elements being in the form of burners, the flames of which are directed away from the retort section causing the refractory lined walls of the chamber to radiate heat as well as cause convection heating.

* * * * *